(12) United States Patent
Liu (10) Patent No.: US 10,650,043 B2
(45) Date of Patent: May 12, 2020

(54) SONG PLAYBACK SYSTEM (71) Applicants:Fu Tai Hua Industry (Shenzhen) Co., Ltd., Shenzhen (CN); HON HAI PRECISION INDUSTRY CO., LTD., New Taipei (TW)

(72) Inventor: Cheng-Xiang Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 69 days.

(21) Appl. No.: 15/981,995

(22) Filed: May 17, 2018

(65) Prior Publication Data
US 2019/0278866 A1 Sep. 12, 2019

(30) Foreign Application Priority Data

Mar. 7, 2018 (CN) .......................... 2018 1 0187605

(51) Int. Cl.
| | |
|---|---|
| *G06F 16/68* | (2019.01) |
| *G06Q 10/02* | (2012.01) |
| *G10H 1/36* | (2006.01) |
| *H04L 12/18* | (2006.01) |
| *G06F 16/638* | (2019.01) |

(52) U.S. Cl.
CPC ............ *G06F 16/68* (2019.01); *G06F 16/639* (2019.01); *G06Q 10/02* (2013.01); *G10H 1/365* (2013.01); *H04L 12/189* (2013.01)

(58) Field of Classification Search
CPC combination set(s) only.
See application file for complete search history.

(56) References Cited

U.S. PATENT DOCUMENTS

| | | | |
|---|---|---|---|
| 2009/0019300 A1* | 1/2009 | Matton ................... | G06F 1/266 713/324 |
| 2014/0095965 A1* | 4/2014 | Li .......................... | G11B 27/10 715/203 |

* cited by examiner

*Primary Examiner* — El Hadji M Sall
(74) *Attorney, Agent, or Firm* — ScienBiziP, P.C.

(57) ABSTRACT

A KTV player in communication with at least one song server is configured to upload a song list of a song database to the song server, obtain a song playback list from the song server, obtain corresponding music scores and pitch curves from the song server according to the song playback list, obtain corresponding songs according to the song playback list, display the songs in sequence on a display, and display the corresponding music scores and pitch curves on the display synchronously with the songs. The song playback list is sent by a mobile terminal in communication with the song server.

5 Claims, 7 Drawing Sheets

SONG PLAYBACK SYSTEM

FIELD

The subject matter herein generally relates to KTV (karaoke TV player), and more particularly to a song playback system including a KTV player, a song server, and a mobile terminal.

BACKGROUND

Generally, a KTV room includes a KTV player installed by the KTV establishment. The KTV player provides karaoke songs to sing.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
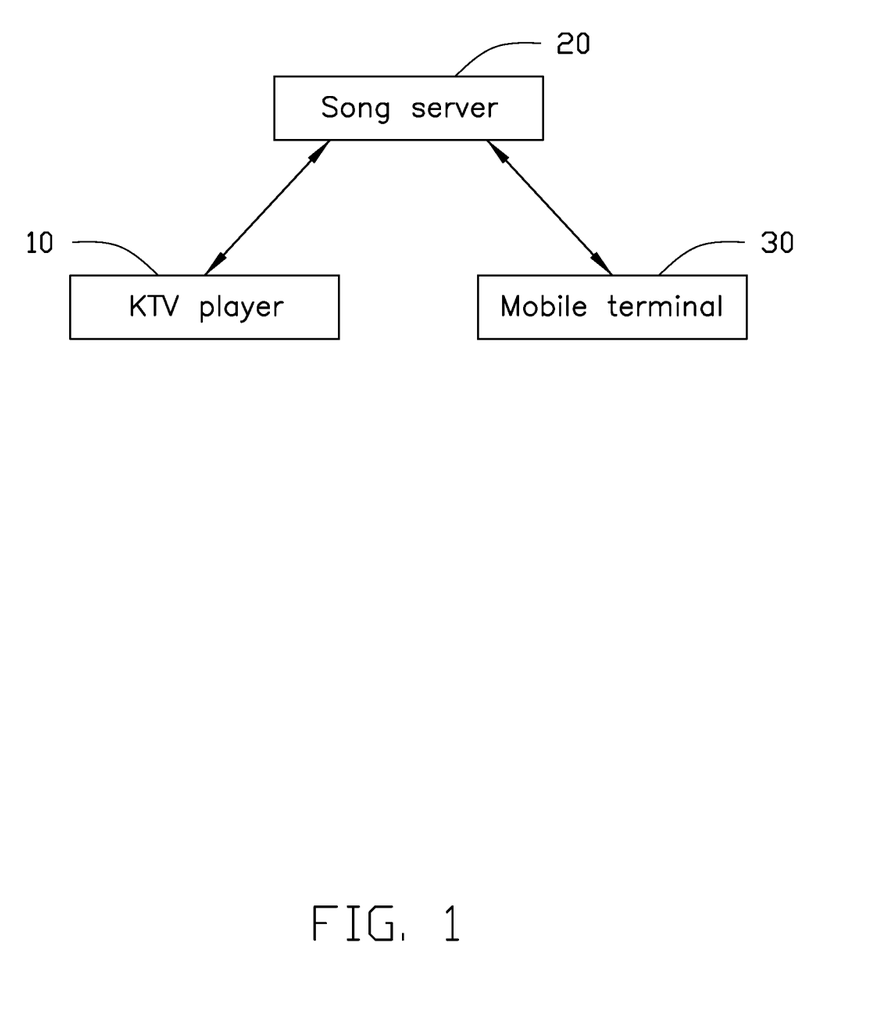
FIG. 1 is a block diagram of a song playback system including a KTV player, a song server, and a mobile terminal.

FIG. 1 illustrates an embodiment of a song playback system. The song playback system includes at least one KTV player 10, at least one song server 20, and at least one mobile terminal 30. The KTV player 10, the song server 20, and the mobile terminal 30 are in communication with each other.

The KTV player 10 uploads a song list of a song database to the song server 20. The song server 20 stores a music score database and a pitch curve database. The music score database includes a plurality of music scores corresponding to songs, and the pitch curve database includes a plurality of pitch curves corresponding to the songs.

The mobile terminal 30 responds to user input to book a room including the KTV player. The mobile terminal 30 also creates a group in response to user input to add songs and music videos as required by the user. The mobile terminal 30 generates a song playback list. The song playback list updates and refreshes in real time in the at least one mobile terminal in the group. The mobile terminal 30 sends the song playback list to the song server 20, and the song server 20 searches for the corresponding music scores and pitch curves according to the song playback list. The KTV player 10 obtains from the song server 20 the song playback list and the corresponding music scores and pitch curves, and displays in real time the music scores and the pitch curves while a user is singing the song.

In at least one embodiment, the mobile terminal 30 may be, but is not limited to, a mobile phone, a tablet computer, or the like. The song server 20 may be, but is not limited to, a network server or a cloud server. The KTV player 10 may be a KTV machine installed in every room of a KTV place, or may be a private KTV machine.

Figure 2:
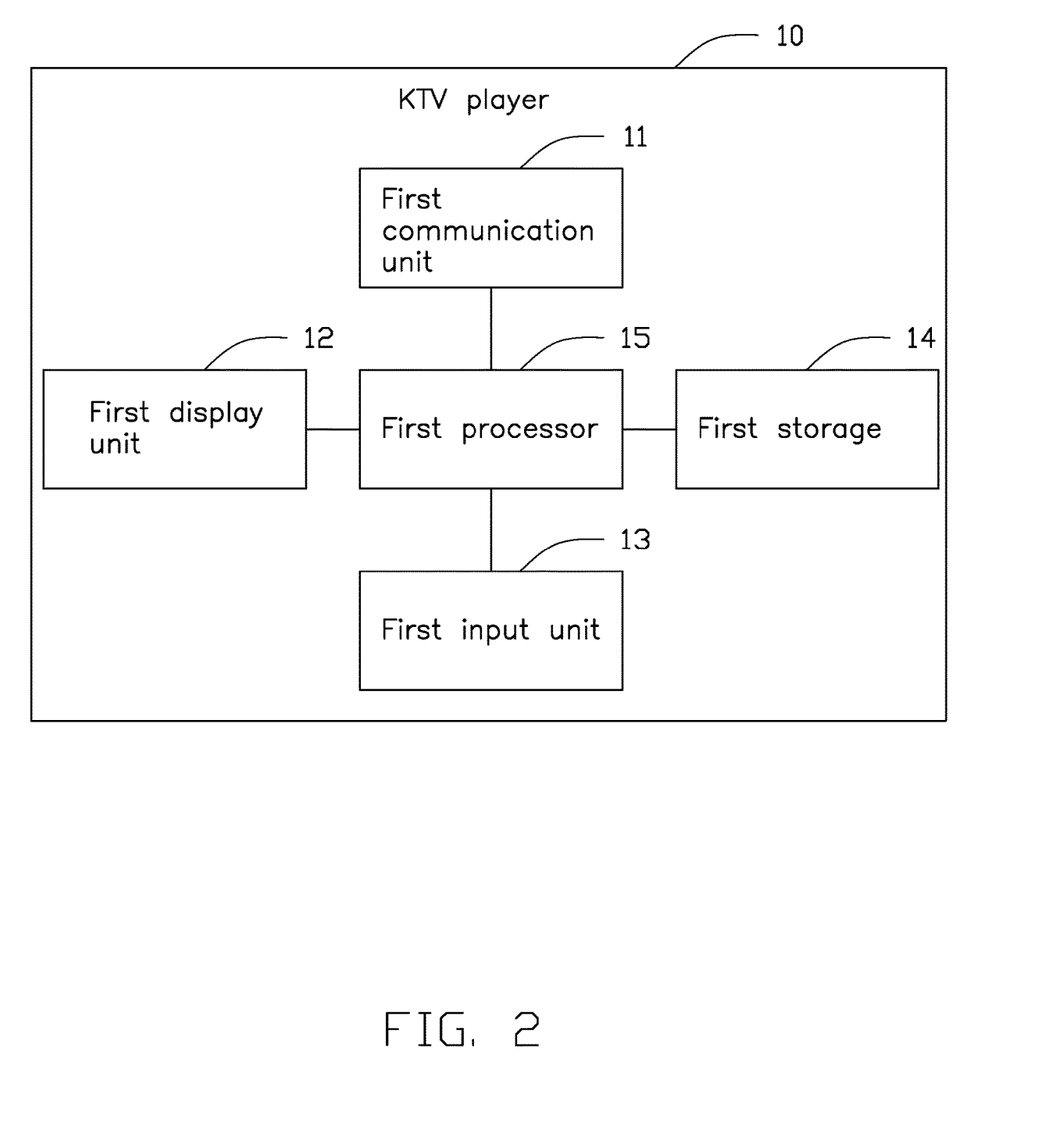
FIG. 2 is a block diagram of the KTV player of FIG. 1.

Referring to FIG. 2, the KTV player 10 includes a first communication unit 11, a first display unit 12, a first input unit 13, a first storage 14, and a first processor 15.

The first communication unit 11 establishes communication with the mobile terminal 30 and the song server 20. In at least one embodiment, the first communication unit 11 may establish communication with the song server 20 and the mobile terminal 30 through a wireless network. The wireless network may be, but is not limited to, WIFI, BLUETOOTH, a cellular network, a satellite network, or the like. In detail, the first communication unit 11 includes an independent WIFI port to allow multiple mobile terminals 30 (such as mobile phones) to access.

The first display unit 12 displays the song list of the KTV player 10, music videos, and the like. In at least one embodiment, the first display unit 12 may be, but is not limited to, a touch screen, a liquid crystal display, or the like.

The first input unit 13 provides an input means for a user to input information and commands. For example, a user may use the first input unit 13 to select songs, skip songs, or the like. The first input unit may be, but is not limited to, a remote controller, a mouse, an audio input device, a touch screen, or the like.

The first storage 14 stores a plurality of data of the KTV player 10, such as the song database and a plurality of software instructions. The first storage 14 may include, but is not limited to, a read-only memory, a random access memory, a programmable read-only memory, an erasable programmable read-only memory, a one-time programmable read-only memory, an electrically-erasable programmable read-only memory, a compact disc read-only memory, or other optical disk storage, magnetic disk storage, magnetic tape storage, or other storage medium.

In at least one embodiment, the first storage 14 stores a song database. The song database includes a list of all songs and corresponding music videos of the KTV player 10.

The first processor 15 may be a central processing unit, a microprocessing unit, a digital processing chip, or other processing chip capable of executing data processing capabilities.

Figure 3:
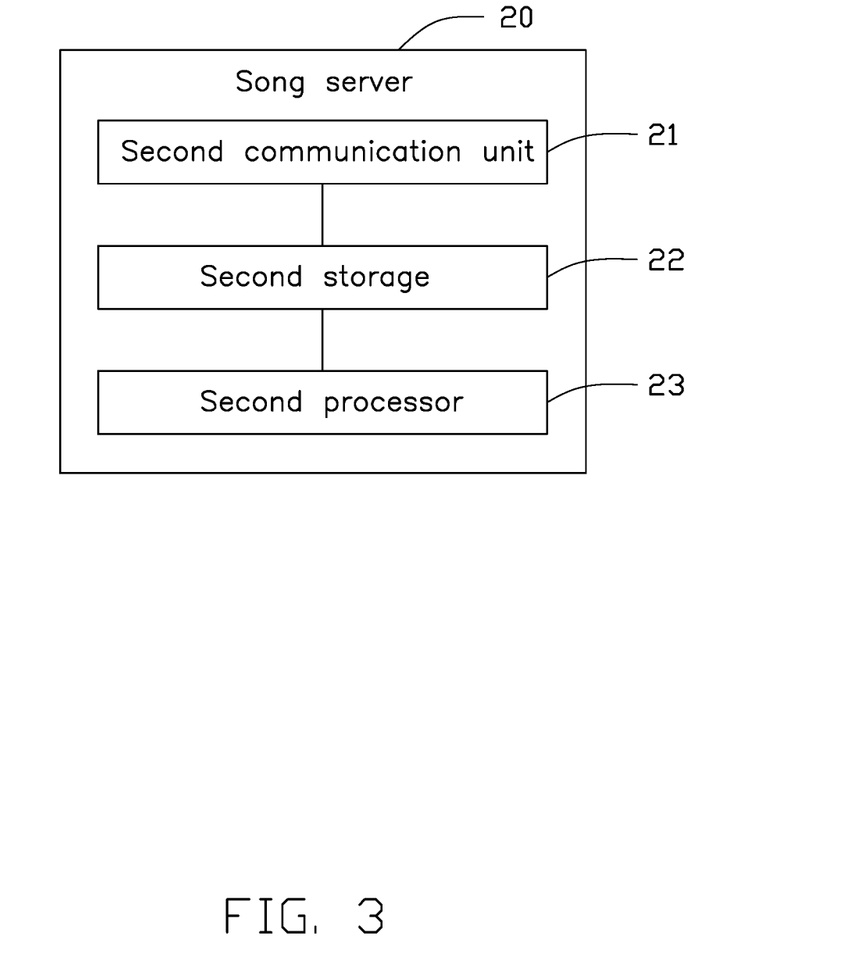
FIG. 3 is a block diagram of the song server of FIG. 1.

Referring to FIG. 3, the song server 20 includes a second communication unit 21, a second storage 22, and a second processor 23.

The second communication unit 21 establishes communication with the KTV player 10 and the mobile terminal 30. In at least one embodiment, the second communication unit 21 may establish communication with the KTV player 10 through wired or wireless means, such as the Internet, a local area network, WIFI, or the like. The second communication unit 21 may establish communication with the mobile terminal 30 through a wireless network, such as WIFI, BLUETOOTH, a cellular network, a satellite network, or the like.

The second storage 22 stores a plurality of data of the song server 20, such as a data database, a plurality of software instructions, or the like. In at least one embodiment, the second storage 22 may include, but is not limited to, a read-only memory, a random access memory, a programmable read-only memory, an erasable programmable read-only memory, a one-time programmable read-only memory, an electrically-erasable programmable read-only memory, a compact disc read-only memory, or other optical disk storage, magnetic disk storage, magnetic tape storage, or other storage medium.

In at least one embodiment, the second storage 22 stores a music score database and a pitch curve database. The music score database includes music scores of a plurality of songs. The music scores may be, but are not limited to, in the form of musical staff or numbered musical notation. The pitch curve database includes the corresponding pitch curves of the songs. The pitch curves indicate pitch of the lyrics. The pitch curves change pitch from high to low synchronously with the lyrics. Thus, a user may follow the pitch curves to sing the songs at the correct pitch. In at least one embodiment, the music scores and the pitch curves of the songs may be uploaded to the song server 20 by a music professional or musician. The music scores and the pitch curves may also be searched from a website or bought.

The second processor 23 may be a central processing unit, a microprocessing unit, a digital processing chip, or other processing chip capable of executing data processing capabilities.

Figure 4:
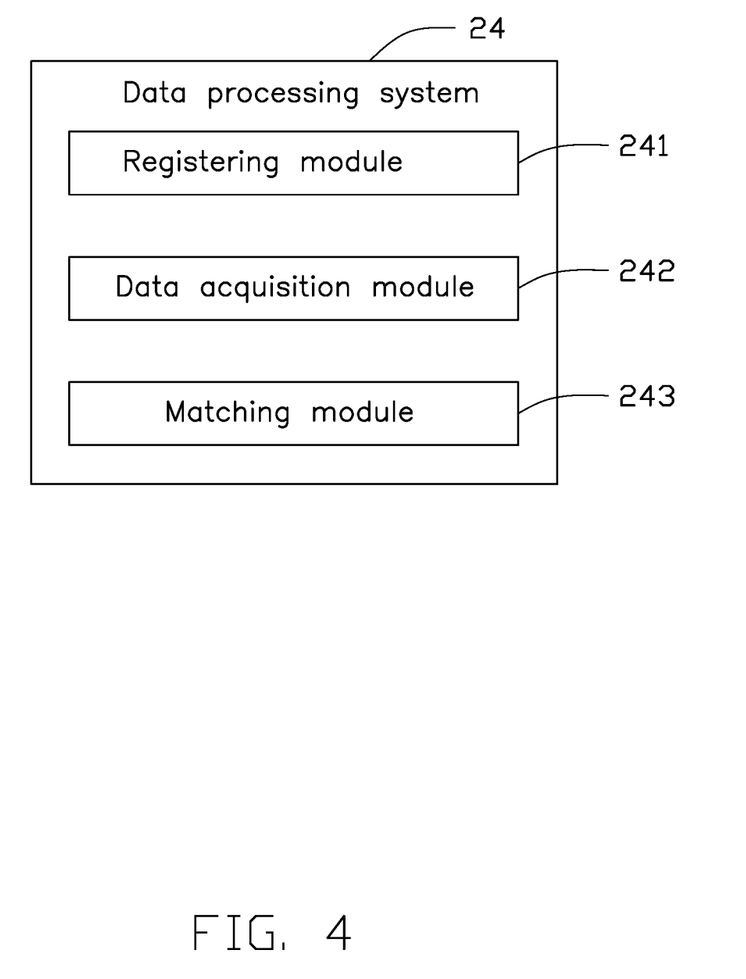
FIG. 4 is a block diagram of a data processing system implemented in the song server.

The song server 20 executes a data processing system 24 (shown in FIG. 4). The data processing system 24 includes a plurality of instructions stored in the second storage 22.

Referring to FIG. 4, the data processing system 24 includes a registering module 241, a data acquisition module 242, and a matching module 243.

The registering module 241 receives registering information from the at least one KTV player 10 to register the KTV player 10. The registering information includes, but is not limited to, a location of the KTV player 10, a name of a KTV place having the KTV player 10, a room number of a room of the KTV player 10, and the like. In at least one embodiment, each KTV player 10 corresponds to unique identification information, such as a serial number or the like.

The data acquisition module 242 obtains a usage status of the room of the registered KTV player 10 and obtains the song list of the KTV player 10. In at least one embodiment, the usage status of the room of the KTV player 10 may be, but is not limited to, "in use", "booked", "open", "in repair", and the like. In at least one embodiment, information of the song list obtained by the data acquisition module 242 includes, but is not limited to, song names, artist names, lyricist names, song storage addresses, and the like.

The data acquisition module 242 further obtains a room booking request from the mobile terminal 30, changes the usage status of the room from "open" to "booked", and saves the usage status. In at least one embodiment, the room booking request includes, but is not limited to, the room number of the room to be booked, a booking time period, user information of a user, and the like.

In detail, the data acquisition module 242 further obtains the song playback list sent from the mobile terminal 30.

The matching module 243 searches the music score database and the pitch curve database for the music scores and the pitch curves corresponding to the songs in the song playback list. The matching module 243 further saves the corresponding music scores, the corresponding pitch curves, the music playback list, and room information to a designated storage location, such as a temporary storage or the second storage 22.

Figure 5:
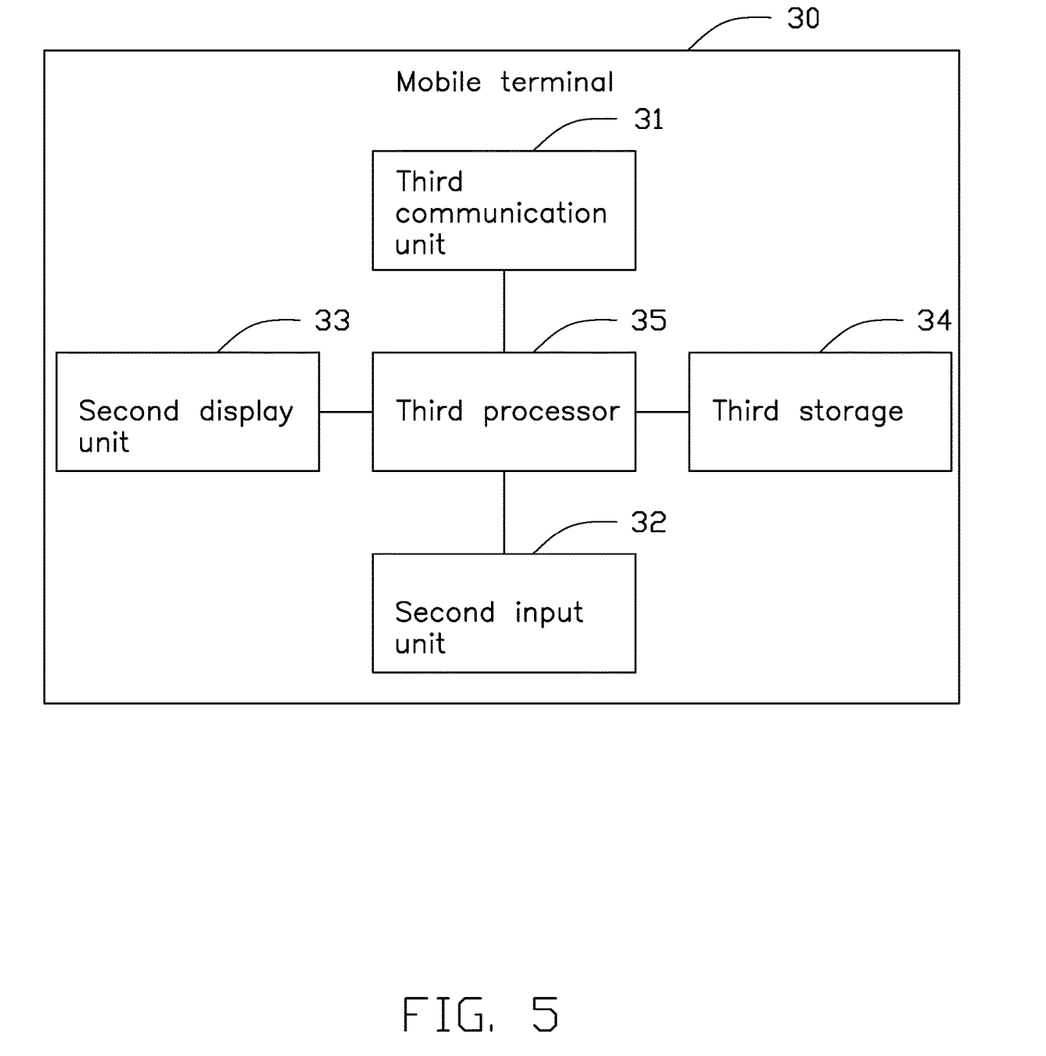
FIG. 5 is a block diagram of the mobile terminal of FIG. 1.

Referring to FIG. 5, the mobile terminal 30 includes a third communication unit 31, a second input unit 32, a second display unit 33, a third storage 34, and a third processor 35.

The third communication unit 31 establishes communication with the song server 20 and the KTV player 10. In at least one embodiment, the third communication unit 31 establishes communication with the song server 20 and the KTV player 10 through a wireless network. The wireless network may be, but is not limited to, WIFI, BLUETOOTH, a cellular network, a satellite network, or the like.

The second display unit 33 displays a plurality of information of the mobile terminal 30. The second display unit 33 may be, but is not limited to, a touch screen, a liquid crystal display, or the like.

The third storage 34 stores a plurality of data of the mobile terminal 30, such as a plurality of software instructions. The third storage 34 may include, but is not limited to, a read-only memory, a random access memory, a programmable read-only memory, an erasable programmable read-only memory, a one-time programmable read-only memory, an electrically-erasable programmable read-only memory, a compact disc read-only memory, or other optical disk storage, magnetic disk storage, magnetic tape storage, or other storage medium.

The third processor 35 may be a central processing unit, a microprocessing unit, a digital processing chip, or other processing chip capable of executing data processing capabilities.

Figure 6:
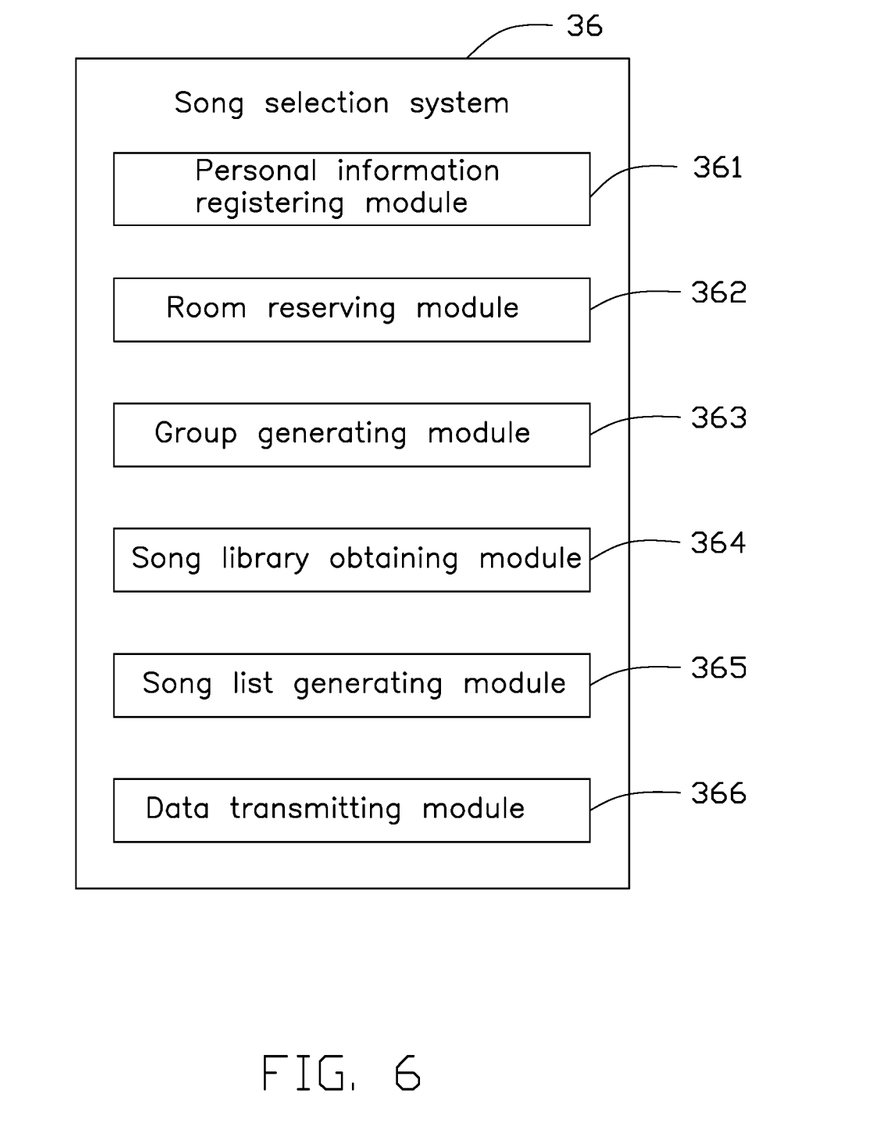
FIG. 6 is a block diagram of a song selection system implemented in the mobile terminal.

The mobile terminal 30 further includes a song selection system 36, which is a plurality of software instructions executed by the third processor 35 and stored in the third storage 34. In at least one embodiment, the song selection system 36 may be an application downloaded by the mobile terminal 30.

Referring to FIG. 6, the song selection system 36 includes a personal information registering module 361, a room reserving module 362, a group generating module 363, a song library obtaining module 364, a song list generating module 365, and a data transmitting module 366.

The personal information registering module 361 responds to user input to register personal information of a user of the mobile terminal 30. The personal information includes a username, password, contact information, and the like. The personal information registering module 361 only needs to register the personal information once. After the personal information is registered, the personal information does not need to be registered a second time.

The room reserving module 362 responds to user input to obtain from the song server 20, and display on the second display unit 33, information of all of the KTV players 10 that have registered with the song server 20. The information of all of the KTV players 10 includes, but is not limited to, the location of the KTV players 10, the name of the KTV place, the room number of the room of the KTV player 10, and the usage status of the KTV room. The room reserving module 362 further responds to user input to select a desired KTV player 10 from the information displayed on the second display unit 33 and generates a room booking request according to the user input, thereby booking the room of the KTV player 10. The song server 20 changes the room status of the room booked by the room reserving module 362 from "open" to "booked". In at least one embodiment, the room booking request includes the KTV room number, the booking time period, and the personal information of the user, such as the name, the contact information, and the like.

The group generating module 363 responds to user input to create a group and adds other mobile terminals 30 in communication with the mobile terminal 30 to the group. In detail, the other mobile terminals 30 may apply to join the group, or the mobile terminal 30 may add the other mobile terminals 30 to the group. In at least one embodiment, a name of the group is the same as the room number of the room.

The song library obtaining module 364 obtains from the song server 20 the song list of the KTV player 10 of the booked room. The song library obtaining module 364 displays the song list on the second display unit 33.

The song list generating module 365 responds to user input on the second display 33 to add songs selected on the second display 33 to the song playback list. In at least one embodiment, the song playback list includes, but is not limited to, song names, artist names, and a storage location of the songs in the KTV player 10. In at least one embodiment, the song list generating module 365 further adds songs selected by users of other mobile terminals 30. In at least one embodiment, the song list generating module 365 also adds songs stored on the mobile terminal 30 to the song playback list. The song playback list includes, but is not limited to, song names, artist names, and a storage location of the songs in the mobile terminal 30.

The data transmitting module 366 sends the song playback list to the song server 20 through the third communication unit 31. In at least one embodiment, the data transmitting module 366 updates and refreshes the song playback list in real time on the displays of the other mobile terminals 30. The song server 20 searches for the music scores and pitch curves corresponding to the songs in the song playback list and saves the corresponding music scores and pitch curves together with the corresponding songs.

Figure 7:
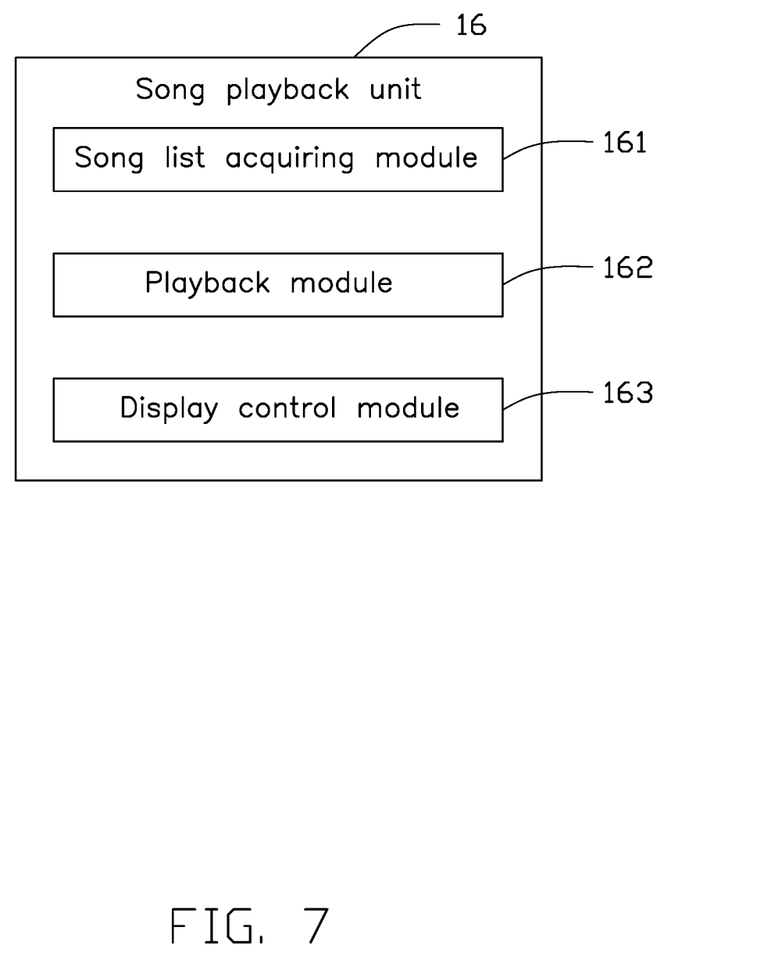
FIG. 7 is a block diagram of a song playback unit of the KTV player.

Referring to FIG. 7, a song playback unit 16 is implemented in the KTV player 10. The song playback unit 16 is saved in the first storage 14 and executed by the first processor 15. The song playback unit 16 includes a song list acquiring module 161, a playback module 162, and a display control module 163.

The song list acquiring module 161 obtains from the song server 20 the song playback list sent by the mobile terminal 30 as well as the corresponding music scores and pitch curves. In at least one embodiment, the display control module 163 obtains from the song server 20 the song playback list when the KTV player 10 is turned on. In another embodiment, the display control module 163 automatically obtains from the song server 20 the song playback list when the time period of the room booking is started.

The playback module 162 searches the first storage 14 for the corresponding songs according to the song playback list and plays the corresponding songs in sequence on the first display unit 12. In at least one embodiment, when there are songs in the song playback list added by a user of the mobile terminal 30, the playback module 162 obtains the songs from the mobile terminal 30 through the first communication unit 11. The display control module 163 displays the corresponding music score and pitch curves on the first display unit 12 when the first display unit 12 displays a song. In detail, in at least one embodiment, the display control module 163 displays the corresponding music score and pitch curves on the first display unit 12 by: calculating a smallest bounding rectangle of lyrics displayed on the first display unit 12; filling in the smallest bounding rectangle with color to cover the lyrics; obtaining the corresponding music score of the lyrics and displaying the music score and lyrics in the smallest bounding rectangle; and displaying the corresponding pitch curves on the music score and the lyrics. In at least one embodiment, the display control module 163 displays in real time a timeline according to a playback progress of the song currently being played.

In another embodiment, the display control module 163 displays the music score and the pitch curves in another position of the first display unit 12, such as on top of or below the lyrics, or on top of the music video.

In at least one embodiment, the mobile terminal 30 further responds to user input to edit in real time the song playback list and a playback sequence of songs.

In at least one embodiment, the mobile terminal 30 further receives a rating of the KTV player 10 and/or room of the KTV player 10, and uploads the rating to the song server 20 or other online platform.

In at least one embodiment, the mobile terminal 30 further provides live online broadcasting of songs played by the KTV player 10 and sung by a user.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A mobile terminal configured to be in communication with at least one song server in communication with at least one karaoke TV player (KTV player) configured to upload a song list to the at least one song server, the mobile terminal comprising:
an input unit; a display unit; a processor; and
a storage configured to store a plurality of instructions, which when executed by the processor, cause the processor to:
obtain, from the song server, all information of the at least one KTV player registered in the song server and display the information of the KTV player on the display unit, wherein the information of the KTV player comprises location information of the KTV player, a room number of a room of the KTV player, and a usage status of the KTV player;
select, in accordance with a user selection on the display unit, a KTV player and generate a room booking request, and send the room booking request to the song server to book the room number of the KTV player;
obtain, from the song server, the song list of the KTV player and display the song list on the display unit;
select, in accordance with a user selection on the display unit, at least one song from the song list and generate a song playback list according to the at least one selected song; and
send the song playback list to the song server, wherein the song server provides corresponding music scores and pitch curves for the songs, sends the corresponding music scores and pitch curves to the KTV player, and the KTV player plays the at least one song with the corresponding music scores and pitch curves synchronized to the at least one song.

2. The mobile terminal of claim 1, wherein the processor is further configured to:
generate, in accordance with user input, a group and add other mobile terminals in communication with the mobile terminal to the group;
receive other songs selected by the other mobile terminals and add the other songs to the song playback list; and
update the song playback list in real time and synchronize the updated song playback list across displays of the other mobile terminals.

3. The mobile terminal of claim 2, wherein the processor is further configured to respond in accordance with user input to edit the song playback list and rearrange a sequence of the song playback list.

4. The mobile terminal of claim 1, wherein the processor is further configured to receive a rating of the KTV player and/or room of the KTV player, and upload the rating to the song server or other online platform.

5. The mobile terminal of claim 1, wherein the processor is further configured to broadcast live online the song sung from the KTV player.

* * * * *